United States Patent
Garrard et al.

(10) Patent No.: US 10,309,300 B2
(45) Date of Patent: Jun. 4, 2019

(54) ELECTRIC ROTOR FIT ONTO A TURBOMACHINE SHAFT

(71) Applicant: BorgWarner Inc., Auburn Hills, MI (US)

(72) Inventors: Tyler Garrard, Buellton, CA (US); Will Robert Nielsen Hippen, Santa Cruz, CA (US); Christopher Meszaros, Brighton, MI (US)

(73) Assignee: BorgWarner Inc., Auburn Hills, MI (US)

( * ) Notice: Subject to any disclaimer, the term of this patent is extended or adjusted under 35 U.S.C. 154(b) by 670 days.

(21) Appl. No.: 14/767,848

(22) PCT Filed: Feb. 20, 2014

(86) PCT No.: PCT/US2014/017455
§ 371 (c)(1),
(2) Date: Aug. 13, 2015

(87) PCT Pub. No.: WO2014/130707
PCT Pub. Date: Aug. 28, 2014

(65) Prior Publication Data
US 2016/0003140 A1 Jan. 7, 2016

Related U.S. Application Data

(60) Provisional application No. 61/767,819, filed on Feb. 22, 2013.

(51) Int. Cl.
*F02B 39/10* (2006.01)
*F02B 39/00* (2006.01)
(Continued)

(52) U.S. Cl.
CPC .............. *F02B 39/10* (2013.01); *F01D 5/02* (2013.01); *F01D 15/10* (2013.01); *F01D 25/16* (2013.01);
(Continued)

(58) Field of Classification Search
CPC ......... F05D 2230/233; F05D 2230/234; F05D 2230/235; F05D 2230/239; F05D 2230/60; F02B 37/04; F02B 37/10
(Continued)

(56) References Cited

U.S. PATENT DOCUMENTS 2,242,360 A    5/1941   Lessmann et al.
3,174,152 A    3/1965   Maclay
(Continued)

FOREIGN PATENT DOCUMENTS

CN    201884224 U    6/2011
CN    201944013 U    8/2011
(Continued)

OTHER PUBLICATIONS

Japanese First Notification of Office Action of counterpart Japanese Patent Application No. 2015-558965 issued by the Japanese Patent Office dated Jun. 20, 2017.
(Continued)

*Primary Examiner* — Jason D Shanske
*Assistant Examiner* — Jessica L Kebea
(74) *Attorney, Agent, or Firm* — Barnes & Thornburg LLP

(57) ABSTRACT

By relieving the shaft of an electronically-controlled turbocharger (ECT) in a central region of where a rotor of an electric machine couples with the shaft eases assembly of the electric machine onto the shaft. On either side of the relieved section, the fit between the shaft and the rotor may be a slip fit or an interference fit. Alternatively, the rotor is
(Continued)

relieved in a central section. In some embodiments, the shaft is welded to the rotor. In yet other embodiments, the outside of the shaft and the inside of the rotor are threaded with a nut or a pin to secure the shaft to the rotor or the rotor itself has threads to engage with threads on the shaft. Such arrangements ease assembly and allow adjustment of dynamic characteristics of the rotor system.

25 Claims, 4 Drawing Sheets

(51) Int. Cl.
  F01D 5/02 (2006.01)
  F01D 15/10 (2006.01)
  F01D 25/16 (2006.01)
  F02B 33/34 (2006.01)
  F02B 37/04 (2006.01)
  F01D 25/24 (2006.01)

(52) U.S. Cl.
  CPC .......... *F01D 25/166* (2013.01); *F01D 25/24* (2013.01); *F02B 33/34* (2013.01); *F02B 37/04* (2013.01); *F02B 39/00* (2013.01); *F05D 2220/40* (2013.01); *F05D 2230/233* (2013.01); *F05D 2230/234* (2013.01); *F05D 2230/235* (2013.01); *F05D 2230/239* (2013.01); *F05D 2230/60* (2013.01); *F05D 2240/24* (2013.01); *Y02T 10/144* (2013.01)

(58) Field of Classification Search
  USPC .......................................................... 60/607
  See application file for complete search history.

(56) References Cited

U.S. PATENT DOCUMENTS

| | | | |
|---|---|---|---|
| 3,812,392 A | 5/1974 | Barton et al. | |
| 4,253,031 A * | 2/1981 | Frister | F01D 15/10 290/52 |
| 4,655,616 A | 4/1987 | Ducan | |
| 4,827,170 A * | 5/1989 | Kawamura | F01D 15/10 290/52 |
| 4,941,760 A | 7/1990 | Suzuki et al. | |
| 5,382,858 A | 1/1995 | Sugiyama | |
| 5,605,045 A * | 2/1997 | Halimi | F01D 5/085 310/52 |
| 6,085,527 A | 7/2000 | Woolenweber et al. | |
| 6,437,474 B1 * | 8/2002 | Chu | H02K 1/2773 29/598 |
| 6,449,950 B1 * | 9/2002 | Allen | F01D 25/166 417/407 |
| 6,998,756 B2 * | 2/2006 | Ishii | F01D 5/026 310/152 |
| 7,946,118 B2 | 5/2011 | Hippen et al. | |
| 8,152,489 B2 | 4/2012 | Shimizu et al. | |
| 8,174,141 B2 | 5/2012 | Delf | |
| 9,044,833 B2 | 6/2015 | Holzschuh | |
| 2005/0029885 A1 * | 2/2005 | Shiao | H02K 5/128 310/156.08 |
| 2005/0034295 A1 * | 2/2005 | Meacham | F16C 32/0468 29/598 |
| 2005/0123417 A1 * | 6/2005 | DelVecchio | F01D 5/025 417/407 |
| 2006/0013693 A1 | 1/2006 | Meacham et al. | |
| 2007/0292268 A1 | 12/2007 | Nishiyama et al. | |
| 2008/0000323 A1 | 1/2008 | Zacche' et al. | |
| 2009/0010760 A1 | 1/2009 | Hayasaka et al. | |
| 2009/0025386 A1 | 1/2009 | Rumsby | |
| 2010/0212643 A1 | 8/2010 | Goedecke et al. | |
| 2010/0218498 A1 | 9/2010 | Shibui et al. | |
| 2010/0308685 A1 * | 12/2010 | Hippen | H02K 17/165 310/214 |
| 2011/0074242 A1 | 3/2011 | Singhal | |
| 2014/0125208 A1 | 5/2014 | Yamashita et al. | |
| 2017/0335756 A1 * | 11/2017 | Donkin | F02B 37/10 |

FOREIGN PATENT DOCUMENTS

| | | |
|---|---|---|
| CN | 101975656 B | 12/2011 |
| CN | 102441811 B | 11/2013 |
| CN | 103884504 B | 6/2014 |
| CN | 104880315 B | 9/2015 |
| DE | 102006000452 A1 | 3/2007 |
| EP | 3242002 A4 * | 7/2018 |
| JP | H0275725 A | 3/1990 |
| JP | 402221635 A | 9/1990 |
| JP | 10257723 A | 9/1998 |
| JP | 2004129500 A | 4/2004 |
| JP | 2006238661 A | 9/2006 |
| JP | 2009144633 A | 7/2009 |
| JP | 2011524961 A | 9/2011 |
| JP | 2012255356 A | 12/2012 |
| WO | 2008020512 A1 | 2/2008 |
| WO | 2014130707 A1 | 8/2014 |

OTHER PUBLICATIONS

PCT Search Report for PCT/US2015/045908, completed Nov. 19, 2015.
Reexamination Notice dated Nov. 21, 2018 of co-pending Chinese Patent Application No. 20148009881.1.
PCT Search Report for PCT/US2014/017455, dated Jun. 27, 2014.
Chinese First Notification of Office Action of counterpart Chinese Patent Application No. 201480009881.1 issued by The State Intellectual Property Office of P.R. China dated Apr. 7, 2017.
Examination Report of counterpart European Patent Application No. 1513258.2 issued by trhe European Patent Office dated Jan. 30, 2019.

* cited by examiner

ELECTRIC ROTOR FIT ONTO A TURBOMACHINE SHAFT

FIELD

The present disclosure relates to fitting a rotor of an electric motor onto a shaft of a turbomachine.

BACKGROUND

The tightness of the fit between a shaft of an electronically-controlled turbocharger (ECT) and a rotor of the electric motor has competing demands. The fit should be tight enough that there is no relative motion between the two at the most demanding operating conditions anticipated. That is, operating conditions in which the torques applied to the shaft and rotor act to present the highest difference in torque urging them to rotate separately and elevated temperature conditions that can affect the fit by unequal thermal expansion. The fit must also resist separation at high rotational speeds due to centrifugal forces acting on the masses causing expansion as well as maintain connection over the entire operating range including extreme cold and hot conditions which can cause unequal thermal expansion. The fit should not be so tight such that stresses set up in the mated parts develop cracks. Furthermore, the fit should be as easy to assemble as possible. In some cases, it may be found useful to heat the rotor or to cool the shaft to facilitate assembly of an interference fit. If such thermal preparation can be avoided or the error rate of the assembly can be reduced, assembly cost is reduced. In prior ECTs, the rotor is fit over the shaft with a slip fit or an interference fit along the majority of the length over which the two are mated. In both the slip and interference fits the inside diameter of the rotor substantially equals the outside diameter of the shaft. With the former, there is a slight clearance and in the latter, there is a slight overlap meaning that the shaft diameter exceeds the rotor inside diameter so that when mated there is an interference. One of the problems of such a large surface area of engagement is that if there is any imperfection in the surface finish or concentricity, the two may become stuck at an intermediate position, i.e., not fully assembled. In addition, due to the minute tolerance ranges used for turbomachinery, cylindricity and roundness further complicate the fit. In the event of deviation in any of the above-described factors, the shaft and the rotor are non compliant.

SUMMARY

To overcome at least one problem identified in the prior art, an electronically-controlled turbomachine is disclosed that includes a shaft having a turbine wheel coupled to a first end of the shaft, a turbine housing section disposed over the turbine wheel, a compressor wheel secured to a second end of the shaft, a compressor housing section disposed over the compressor wheel, and an electric machine disposed on the shaft. The rotor is located between the turbine and the compressor sections. The electric machine comprises a rotor and a stator. The rotor is fixed onto a portion of the shaft. The portion of the shaft has first, second, and third axial sections. The inside diameter of the rotor is greater than the diameter of the second axial section. The second axial section is located between the first and third axial sections.

In some embodiments, the inside diameter of the rotor is substantially equal to an outside diameter of the shaft along the first and third axial sections. Alternatively, the inside diameter of the rotor is slightly smaller than an outside diameter of the shaft along the third axial section so that an interference fit is formed along the third axial section and the third axial section is located closer to the turbine wheel than the first and second axial sections. In some embodiments, the inside diameter of the rotor is substantially equal to the outside diameter of the shaft along the first axial section. In the present disclosure, a slip fit is a fit in which inside diameter of the rotor is substantially equal to the outside diameter of the shaft but with a minimal clearance between the two. The two parts are engaged by hand or with a modest amount of pressure. In an interference fit the two diameters are substantially equal but with the inside diameter of the rotor slightly smaller than the outside diameter of the shaft. Furthermore, in the present disclosure, the term interference fit is also used to refer to what might be called an expansion fit and a shrink fit, e.g., when the rotor is heated to fit over the shaft and/or the shaft is cooled to allow insertion into the rotor. When the two parts come to the same temperature, the interference occurs.

In one embodiment, an end of the rotor proximate the first axial section of the shaft is welded to the shaft. The weld is by one of electron beam, laser, and tungsten inert gas welding. Alternatively, the shaft and the rotor are ultrasonically or friction welded.

The weld may be located along the interface between the shaft and the rotor in one or both of the first and third axial sections. In another embodiment, the shaft has a fourth axial section located between the third axial section and the turbine wheel. The fourth axial section includes a surface extending outwardly in a substantially radial direction which mates with a surface of the rotor that extends in a substantially radial direction. The mating surfaces are friction welded.

In one embodiment, the shaft has a threaded axial section between the rotor and the compressor axial section. A nut engages with the threads on the shaft to cause the rotor to abut against the stop.

In yet another alternative, the shaft is threaded for at least a fraction of the length of the first portion.

The inside diameter of the rotor is substantially uniform along the length of the rotor and the shaft of the turbomachine is cutback along the second axial section. Alternatively, the rotor is cutback along the length that mates with the second axial section of the shaft.

The shaft may include a stop section that is located between the third axial section and the turbine wheel. The stop section of the shaft has a greater diameter than the third axial section; and the stop section locates the rotor onto the shaft in an axial direction.

The length and diameter of the first, second, and third axial sections are selected to provide the desired vibrational characteristics within the speed range of the turbomachine.

The turbomachine further includes a motor housing disposed over the electric machine and first and second bearings are disposed on the shaft. The first bearing is located between the compressor section and the rotor. The second bearing is located between the turbine section and the rotor.

Also disclosed is an electronically-controlled turbomachine that includes a rotor of an electric machine and a shaft having a wheel coupled to a first end of the shaft. The wheel is a turbine wheel or a compressor wheel. The shaft has an axial portion adapted to mate with the rotor. The axial portion has a first axial section having a first diameter, a second axial section having a second diameter, and a third axial section having a third diameter. The second axial section is located between the first and third axial sections and the second diameter is smaller than the first and third diameters.

In one alternative, the first and third diameters are substantially equal and an inside diameter of the rotor is slightly smaller than the first diameter so as to form an interference fit between the rotor and the shaft along the first and third axial sections. In another alternative, the first axial section is farther from the turbine wheel than the third axial section and the third diameter is greater than the first diameter. The inside diameter of the rotor is substantially equal to the first diameter to form a slip fit and an interference fit is formed between the rotor and the shaft along the third axial section.

In some embodiments, a fourth axial section is disposed between the third axial section and the turbine wheel. The fourth axial section has a fourth diameter that is larger than the third diameter. The rotor has an inside diameter less than the fourth diameter. The fourth axial section serves as a stop to the rotor.

In one alternative, the shaft has a threaded section proximate the first axial section. A nut is engaged with the threads on the shaft to cause the rotor to abut the stop. Alternatively, the inside surface of the rotor has a threaded section engaged with the threaded section associated with the shaft. In some embodiments, the third diameter associated with the shaft is greater than the inside diameter of the unthreaded inner surface section of the rotor.

In some embodiments, the length of the second axial section is longer than the first axial section and the second axial section is longer than the third axial section. Alternatively, the first, second, and third axial sections are roughly the same length.

The rotor is part of an electric machine, a pneumatic machine, or a hydraulic machine.

In one embodiment in which the wheel is a turbine wheel, the turbomachine may further include a compressor wheel coupled to a second end of the shaft with the rotor located between the turbine wheel and the compressor wheel.

An advantage according to some embodiments is that the length of the interference fit between the rotor and the turbocharger shaft is less than the entire length over which they couple. This eases assembly and reduces the potential for the rotor to stick onto the shaft during assembly prior to full engagement, thereby reducing the number of parts that are scrapped.

Turbocharger speeds can be into the range of 350,000 rpm. Bending of the shaft is to be avoided. It has been found that by having a slip fit and/or press fit between the turbocharger shaft and the electric rotor over less than the length of the interface can lead to less bending during installation and/or during operation. The relative lengths of the axial sections of the various fit types can be tuned based on the dynamics of the system to yield the desired vibrational characteristics over the turbomachine's speed range.

An electronically-controlled turbomachine is disclosed that has a rotor and a shaft having a wheel coupled to a first end of the shaft. The shaft has an axial portion that mates with the rotor. The axial portion has: a first axial section having a first diameter, a second axial section having a second diameter, and a third axial section having a third diameter. The second axial section is located between the first and third axial sections. The second diameter is small than the first and third diameters. The wheel is a turbine wheel or a compressor wheel. In some embodiments, the first axial section is farther from the wheel than the third axial section and the third diameter is substantially equal to the first diameter. In one embodiment, the first and third axial sections form a slip fit with the rotor. In another embodiment, the first and third axial sections form an interference fit with the rotor. In yet another embodiment, the first axial section forms a slip fit and the third axial section forms an interference fit between the rotor and the shaft.

In some embodiments, the turbomachine is an electronically-controlled turbocharger in which the wheel on the first end is a turbine wheel. A compressor wheel is coupled to a second end of the shaft. In some alternatives, an interference fit exists between the shaft and the rotor along the third axial section.

Also disclosed is an electronically-controlled turbomachine having a rotor with a first axial rotor section, a second axial rotor section and a third axial rotor section. The turbomachine also has a wheel (compressor wheel or turbine wheel) coupled to a first end of the shaft. The shaft has an axial portion adapted to engage with the rotor. The axial portion has a first axial shaft section that engages with the first axial rotor section, a second axial shaft section within the second axial rotor section, and a third axial shaft section that engages with the third axial rotor section. The second axial shaft section is located between the first and third axial shaft sections. A difference between an inner diameter of the second axial rotor section and an outer diameter of the second axial shaft section is greater than a difference between an inner diameter of the third axial rotor section and an outer diameter of the third axial shaft section. The wheel may be a compressor wheel or a turbine wheel.

In some alternatives, an outer diameter of the first axial shaft section equals the outer diameters of the second and third axial shaft sections. The inner diameter of the first axial rotor section is substantially equal to the first outer diameter of the first axial shaft section. In some embodiments, the outer diameter of the second axial shaft section is less than the outer diameter of the first axial shaft section to provide a cutback shaft.

The first axial shaft section is farther from the wheel than the third axial shaft section and an outer diameter of the third axial shaft section is substantially equal to an outer diameter of the first axial shaft section such that the third axial shaft section and the third axial rotor section form a slip fit or an interference fit and the first axial shaft section and the first axial rotor section form a slip fit or an interference fit.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
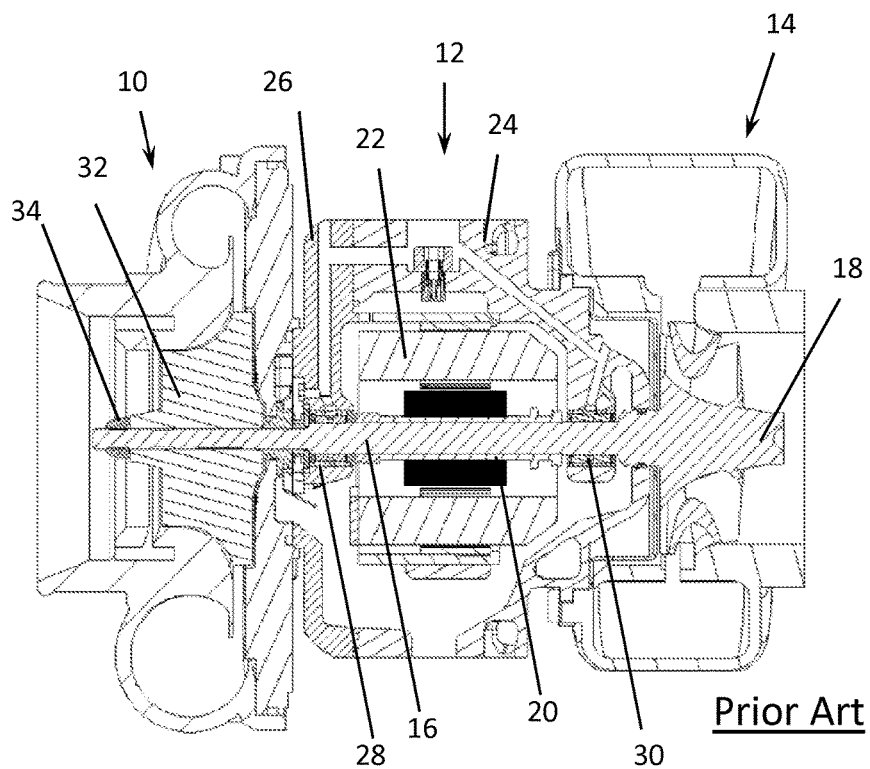
FIG. 1 is an cross-sectional view of an electronically-controlled turbocharger.

In FIG. 1, an ECT is shown in cross section. The ECT has a compressor section 10, an electric machine section 12, and a turbine section 14. A shaft 16 passes through sections 10, 12, and 14. A turbine wheel 18 is affixed to shaft 16 by welding, or by mechanical fasteners, or any other suitable manner of coupling two members.

Electric machine section 12 includes an electric machine that includes a rotor 20 and a stator 22 enclosed within two housing portions: a turbine side housing portion 24 and a compressor side housing portion 26. The electric machine can be operated as either a motor, in which electrical energy is applied to the motor to cause the shaft to rotate faster than it would otherwise, or as a generator, in which an electrical load is applied to the motor to cause the shaft to rotate slower than it would otherwise. The terms electric machine, motor, and generator are used herein interchangeably with the understanding that depending on the embodiment, the electric machine may be operated as a motor, generator, or neither if no electric current is applied to windings associated with the rotor. In some embodiments, the electric machine may be adapted to operate only as a motor or only as a generator. Bearings 28 and 30 are disposed in housing portions 26 and 24, respectively, to support shaft 16. Considered axially, bearing 30 is located between rotor 20 and turbine section 14 and bearing 28 is located between rotor 20 and compressor section 10.

Rotor 20 of the electric machine is pressed onto shaft 16 such that rotor 20 rotates with shaft 16. Thus, the tightness of the fit and the length over which the two are fit are selected to ensure no relative rotation of the two.

A compressor wheel 32 is provided on the end of shaft 16 distal from turbine wheel 18. Compressor wheel 32 is held onto shaft 16 via a nut 34 in the embodiment of FIG. 1. The compressor wheel 32 is typically manufactured from a light alloy dissimilar from the turbo shaft 16 preventing a weldment. Compressor wheel 32 is typically clamped the shaft via a fastener or threaded feature.

Figure 2:
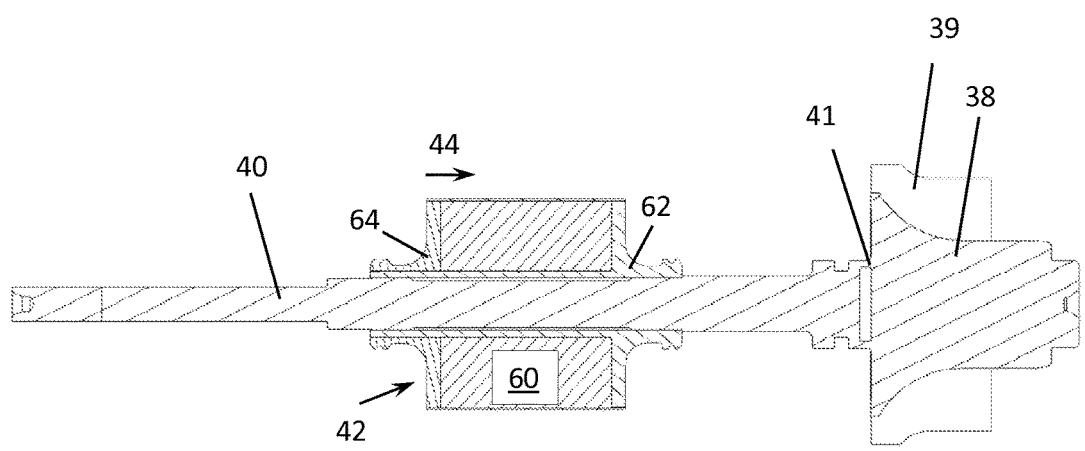
FIG. 2 is a cross-sectional view of a rotor and turbocharger shaft assembly.

In FIG. 2, a rotor and turbine shaft assembly is shown. Turbine wheel 38 having turbine blades 39 is welded to shaft 40 at weld joint 41. Alternatively, turbine wheel 38 couples to shaft 40 via a nut or other suitable fastener or other suitable joining technique. Rotor 42 is slid over shaft 40 with rotor 42 moved in direction 44 with respect to shaft 40. Shaft 40 is cutback in the center of the section onto which rotor 42 is affixed. Rotor 42 includes magnets 60 and end support sections 62 and 64.

Figure 3:
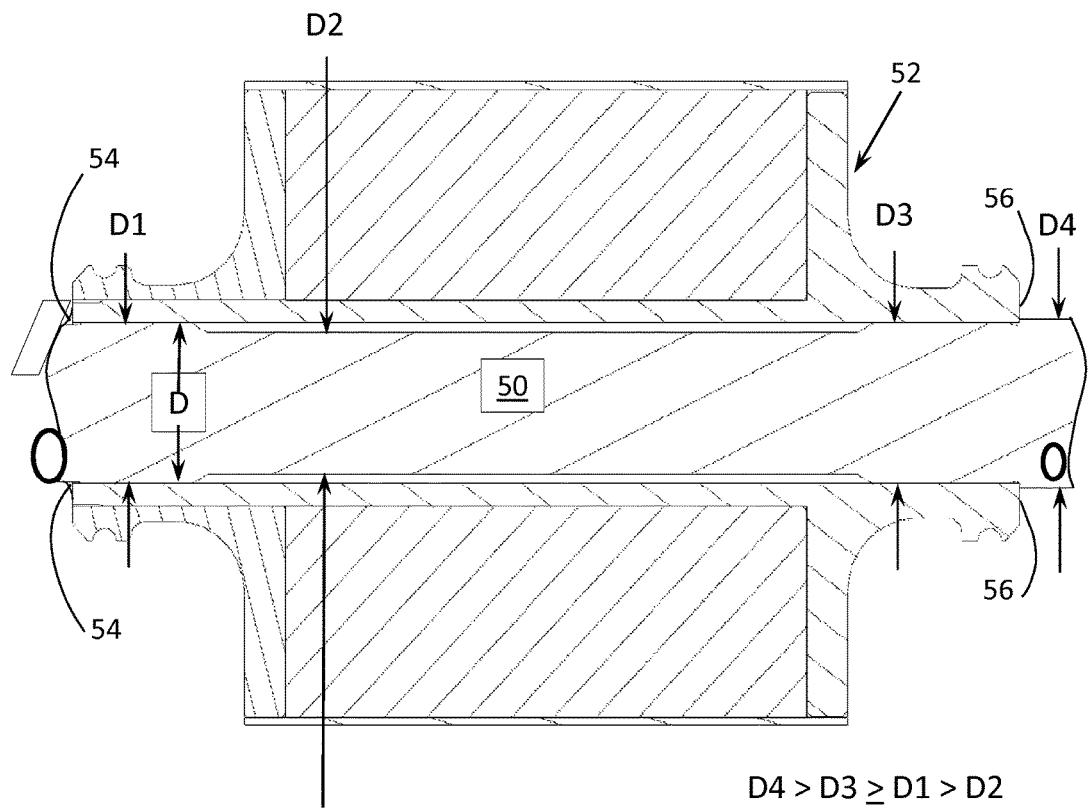
FIGS. 3, 5, 6, 7, and 8 are cross-sectional views of embodiments of a rotor and a portion of a turbocharger shaft as assembled.

A detail of a portion of a turbocharger shaft 50 is shown in FIG. 3 with a rotor 52 placed over shaft 50. Shaft 50 has different diameters along the length. Along a first length, shaft 50 has a diameter D1; along a second length, shaft 50 has a diameter D2; along a third length, shaft 50 has a diameter D3; and along a fourth length, shaft 50 has a diameter D4, where D4>D3≥D1>D2. Rotor 52 has an inner diameter of D. D2 is less than D so that there is a slight gap between rotor 52 and shaft 50. D4 is greater than D by a sufficient amount so that D4 acts as a stop to rotor 52, i.e., the area where D4 is located positions rotor 52 on shaft 50. In one embodiment, D1=D3=D, i.e., the three are substantially equal. Rotor 52 is a slip or slide fit along the first and third lengths. In an alternative embodiment, D1>D and D3>D forming an interference fit in the shaft regions with diameters D1 and D3. Such an interference fit can be, in one non-limiting example, 0.025 mm difference in diameter. Depending on the materials, rotor 52 may be press fit onto shaft 50 at room temperature, i.e., the material deforms sufficiently to allow an interference fit. With some materials, the temperature of rotor 52 is elevated compared to the temperature of shaft 50 to allow assembly. When the two reach a temperature equilibrium, the tensile and compressive forces due to the interference fit cause the two to be coupled together even in the presence of a relative torque force. In yet another embodiment, D1=D and D3>D such that a slip or press fit is formed along the first length, i.e., the first portion of shaft 50 that couples with rotor 52 during assembly. Then, an interference fit is formed along the third length, the last portion over which rotor 52 slides over shaft 50.

An embodiment is described above in which rotor 52 is held onto shaft 50 by appropriate fitting of the shaft along first and third lengths. In an alternative embodiment, rotor 52 is welded to shaft 50. A weld fillet 54 is provided at the left end of rotor 52, as shown in FIG. 3. Any of electron beam, laser, or tungsten inert gas welding may be used. Or any suitable welding technique may also be used.

Figure 4:
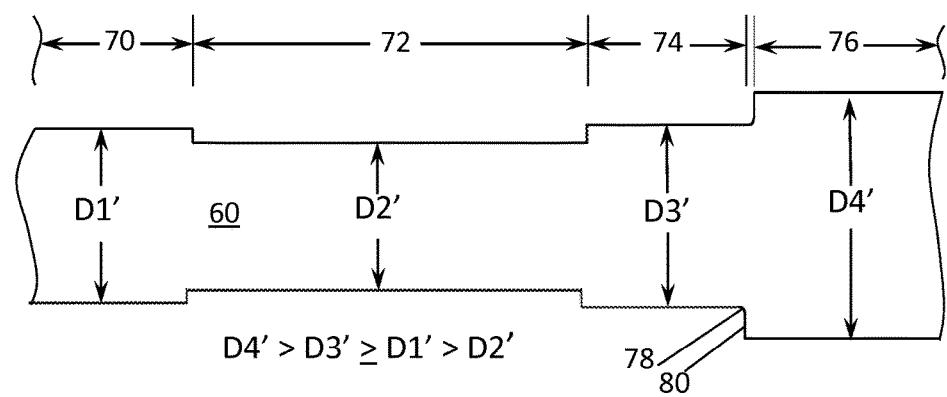
FIG. 4 is an exaggerated view of a portion of a turbocharger shaft.

In FIG. 4, an exaggerated version of a turbocharger shaft is shown in which a first, second, third, and fourth axial portions, 70, 72, 74, and 76, respectively, have diameters D1', D2', D3', and D4', respectively. And, D4'>D3'>D1'>D2'. In FIG. 4, D3'>D1'. However, in an alternative embodiment, D3' substantially equals D1'. Between 74 and 76, a fillet 78 to provided to relieve stress risers. Although not shown, chamfers or fillets are provided between the portions 70, 72, and 74 for stress relief and to avoid burrs that would interfere during assembly of the rotor onto the shaft.

In the embodiment in FIG. 3, shaft 50 is ultrasonically or friction welded to rotor 52. In one alternative, the two are welded at one or both of first and third lengths, i.e., circumferentially at the shaft and rotor interface at which they are slip fit together.

In another alternative, shaft 60, of FIG. 4 has a stop surface 80 that extends outwardly in a substantially radial direction. Stop surface 80 mates with an end surface 56 of rotor 52 (shown in FIG. 3). The shaft may be rotated with respect to the rotor so that surfaces 80 and 56 are friction welded. Alternatively, high-frequency ultrasonic vibrations are applied to surfaces 80 and 56 to ultrasonically weld the rotor to the shaft. Surfaces 80 and 56 are shown in FIGS. 3 and 4, respectively, as being substantially perpendicular to a center axis of the shaft. However, the surfaces could be at other angles.

Figure 5:
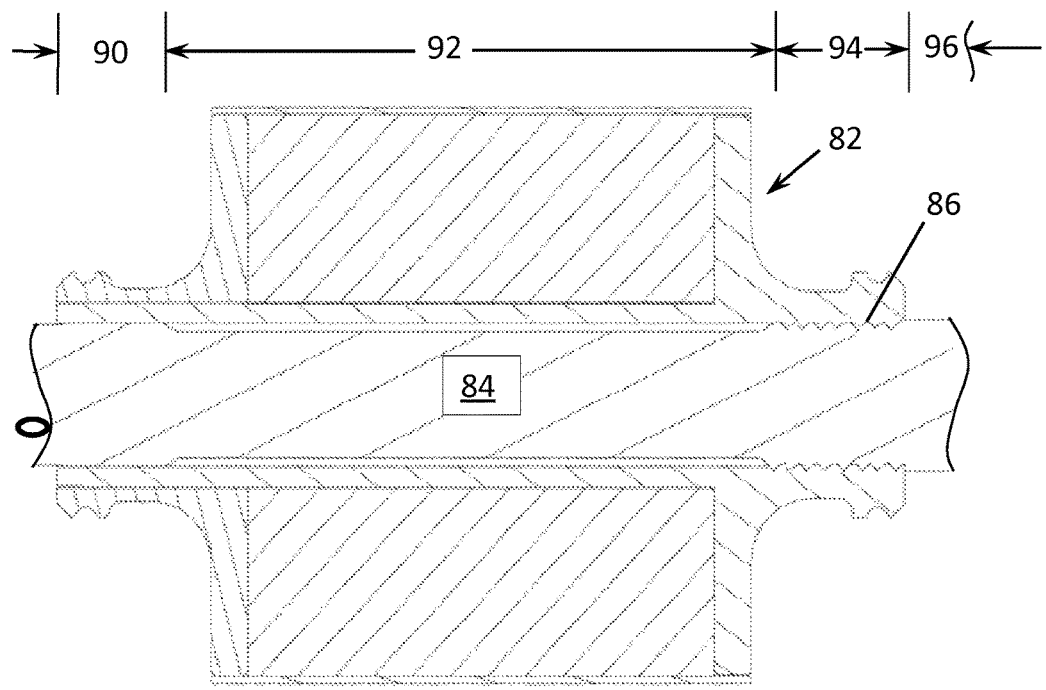

In FIG. 5, an alternative embodiment of a rotor 82 and a shaft 84 are shown. Along a first portion 90, rotor 82 and shaft 84 are fit together in a slip or interference fit. Along a second portion 92, there is a gap between the outside diameter of shaft 84 and an inside diameter of rotor 82. Rotor 82 and shaft 84 are threaded along a fourth portion 94. Fourth portion 96 of shaft 84 extends out of rotor 82. The diameter of portion 96 is greater than the diameter of rotor 82 along first, second, and third portions, 90, 92, and 94, respectively, with an end of portion 96 acting as a stop for rotor 82. In embodiments, in which torque between rotor 82 and shaft 84 is only in one sense, by appropriate selection of right handed or left handed threads allows the relative torque to push rotor 82 into the stop associated with portion 96. In a situation in which the torque can be of either sense, a lock pin (not shown) can be applied to maintain a shoulder of rotor 82 pressed against the stop associated with portion 96.

Figure 6:
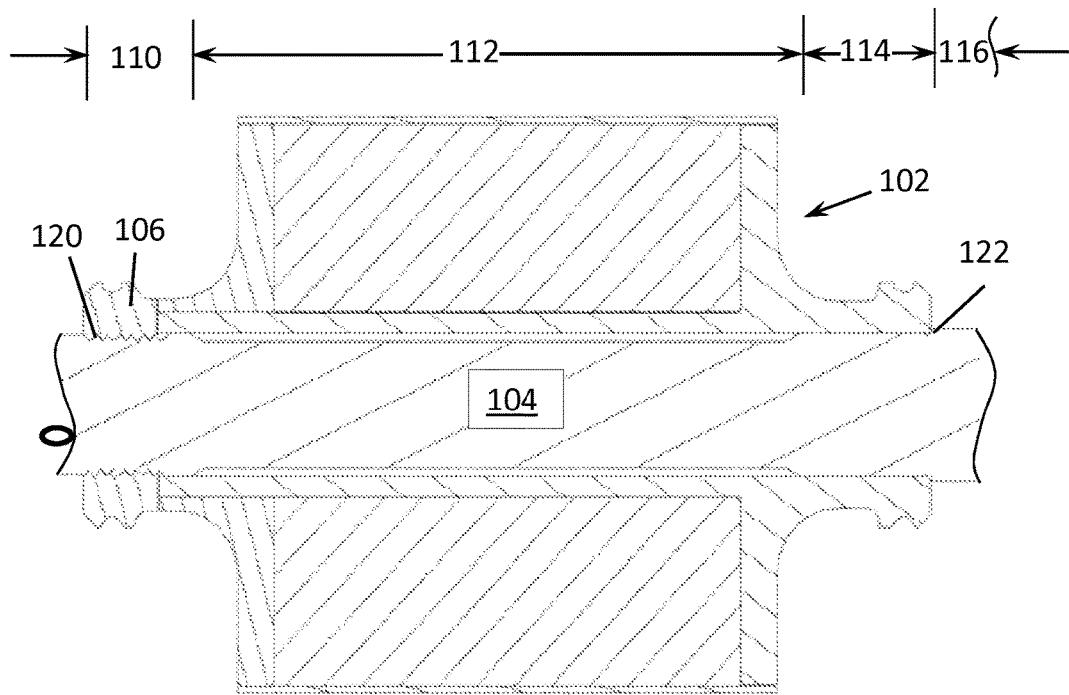

In FIG. 6, yet another alternative of a rotor 102 and a shaft 104 has a first portion on which at least part of the length of shaft 104 is threaded. A nut 106 engages with threads 120 of shaft 104 and jams rotor 102 against a stop 122 located at an interface between a third axial portion 114 and a fourth axial portion 116. A second axial portion 112 includes a cutback between rotor 102 and shaft 104. In one embodiment, rotor 102 and shaft 104 have a slip fit along a third axial portion 114. In an alternative embodiment, rotor 102 and shaft 104 have an interference fit along third axial portion 114.

As shown in FIG. 6, nut 106 is separate from rotor 102. In an alternative embodiment, nut 106 is not a separate element, but instead integrated with the rotor.

In the embodiments described with regard to FIGS. 3-6, the desired relative diameters between the rotor and the shaft are provided by cutting back the shaft. Alternatively, the rotor could be machined internally to provide the desired fit or gap along the length over which the two parts couple.

Figure 7:
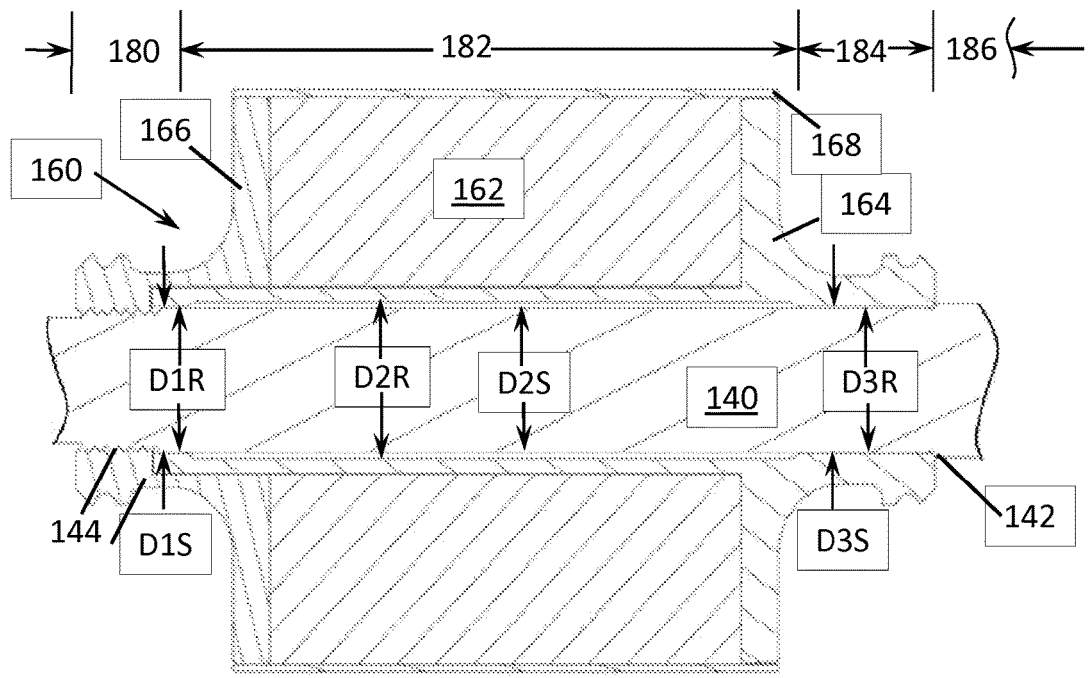

In FIG. 7, an embodiment in which the diameter of the rotor is increased in the center section of the rotor. A shaft 140 engages with a rotor 160 in a first axial section 180, a second axial section 182, and a third axial section 184. Shaft 140 has a first axial section 180 which has an outside diameter, D1S, that is substantially the same as an inside diameter, D1R, of rotor 160. Also along first axial section 180, there are threads 144 on shaft 140 and rotor 160. Along second axial section 182, shaft 140 has an outside diameter, D2S, which is less than inner diameter, D2R, of rotor 160. Along third axial section 184, an outside diameter, D3S, of the shaft substantially equals an inner diameter, D3R, of rotor 160. In one embodiment, shaft 140 and rotor 160 are slip fit together along third axial section 184. In another embodiment, shaft 140 and rotor 160 have an interference fit along third axial section 184. Herein, both the slip fit and the interference fit are described as having the inner diameter of the rotor and the outer diameter of the shaft substantially equal because as known by one skilled in the art, the difference in dimension between a slip fit and an interference fit is small. Thus, the two diameters are substantially equal.

In the embodiment shown in FIG. 7, D1S=D2S=D3S. Shaft 140 deviates from the same diameter at stop 142 which is used to located rotor 160 on shaft 140 in an axial direction. Also, rotor 140 has internal threads 144 along part of first axial section 180. In other embodiments, the D1R diameter and D1S diameter exist along the entire first axial section.

Figure 8:
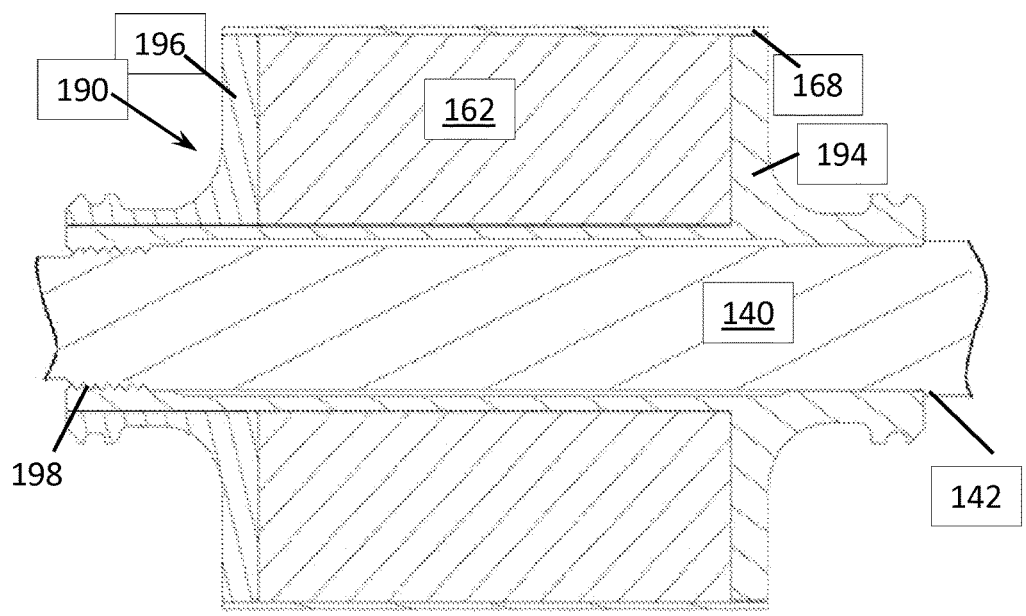

Rotor 160 is comprised of an end cap 164 that includes the portion that extends over shaft 140, end cap 166 that includes threads 144 to engage with threads of shaft 140, magnets 162, and sleeve 168 to contain magnets 162. These components other than the magnets may be welded together. In FIG. 8, an alternative rotor 190 is shown that has an end cap 194 that includes threads 198 to engage with threads on shaft 140. In some embodiments with threads, stop 142 of FIGS. 7 and 8 is not used.

The type of fit to obtain the desired static and dynamic characteristics depends on at least: the materials of the rotor and the shaft, the temperatures that are expected during operation and during non-operational hot and cold soak periods, the maximum operating speeds, the torque to be transmitted through the shaft-to-rotor fit, the mass of the rotor, and the length of the fitted joint or joints.

A turbocharger is a particular type of turbomachine. The two terms are not being used interchangeably in the present disclosure. A turbocharger includes a turbine and a compressor; whereas, a turbomachine includes at least one of a compressor and a turbine.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. An electronically-controlled turbomachine, comprising:
 a shaft having a turbine wheel coupled to a first end of the shaft;
 a turbine housing section disposed over the turbine wheel;
 a compressor wheel secured to a second end of the shaft;
 a compressor housing section disposed over the compressor wheel; and
 an electric machine disposed on the shaft and located between the turbine and the compressor housing sections, wherein: the electric machine comprises a rotor and a stator; the rotor is fixed onto a portion of the shaft; the portion of the shaft has first, second, and third axial sections; an inside diameter of the rotor is greater than a diameter of the second axial section; and the second axial section is located between the first and third axial sections;
 wherein the shaft has a stop section that is located between the third axial section and the turbine wheel; the stop section of the shaft has a greater diameter than the third axial section; and the stop section locates the rotor onto the shaft in an axial direction;
 and wherein the shaft has a threaded section between the rotor and the compressor section, the turbomachine further comprising: a nut engaged with the threads on the shaft to cause the rotor to abut against the stop.

2. The turbomachine of claim 1 wherein the inside diameter of the rotor is equal to an outside diameter of the shaft along the first and third axial sections.

3. The turbo machine of claim 1 wherein the shaft and rotor are welded by one of ultrasonic welding and friction welding by rotating the shaft relative to the rotor.

4. The turbomachine of claim 3 wherein a weld is located along an interface between the shaft and the rotor in at least one of the first and third axial sections.

5. The turbomachine of claim 3 wherein the stop section includes a surface that extends outwardly in a radial direction that mates with a surface of the rotor that extends in a radial direction; and the mating surfaces are friction welded.

6. The turbo machine of claim 1 wherein the inside diameter of the rotor is smaller than an outside diameter of the shaft along the third axial section so that an interference fit is formed along the third axial section and the third axial section is located closer to the turbine wheel than the first and second sections.

7. The turbo machine of claim 1 wherein the inside diameter of the rotor is equal to the outside diameter of the shaft along the first axial section and the inside diameter of the rotor is less than the outside diameter of the shaft along the third axial section to thereby form an interference fit.

8. The turbomachine of claim 1, further comprising:
 a motor housing disposed over the electric machine; and first and second bearings disposed on the shaft wherein the first bearing is located between the compressor section and the rotor; and the second bearing is located between the turbine section and the rotor.

9. An electronically-controlled turbomachine, comprising:
a rotor; and
a shaft having a wheel coupled to a first end of the shaft, the shaft having an axial portion that mates with the rotor, the axial portion having:
a first axial section having a first diameter;
a second axial section having a second diameter; and
a third axial section having a third diameter wherein the second axial section is located between the first and third axial sections; the second diameter is smaller than the first and third diameters; and the wheel is one of a turbine wheel and a compressor wheel,
and wherein an inside diameter of the rotor is uniform along at least a majority of the length of the rotor, one of a slip fit and an interference fit exists between the rotor and the shaft along the first axial section and one of a slip fit and an interference fit exists between the rotor and the shaft along the third axial section,
and wherein the shaft has a stop that is located between the third axial section and the wheel; the stop has a greater diameter than the third axial section; and the stop locates the rotor onto the shaft in an axial direction.

10. The turbomachine of claim 9 wherein the first axial section is farther from the wheel than the third axial section and the third diameter is equal to the first diameter.

11. The turbomachine of claim 9 wherein the rotor is affixed to the shaft by one of: electron beam welding, laser welding, tungsten inert gas welding, ultrasonic welding, and friction welding by rotating the shaft relative to the rotor.

12. The turbo machine of claim 9 wherein the wheel coupled to the first end of the shaft is a turbine wheel, the turbomachine further comprising:
a compressor wheel coupled to a second end of the shaft with the rotor located between the turbine wheel and the compressor wheel.

13. The turbo machine of claim 9 wherein the shaft has a threaded section proximate the first axial section, the turbomachine further comprising: a nut engaged with the threads on the shaft to cause the rotor to abut against the stop.

14. The turbomachine of claim 9 wherein:
the shaft has a threaded section proximate the first axial section;
an inside surface of the rotor has a threaded section engaged with the threaded section associated with the shaft; and
the rotor abuts the stop.

15. A turbomachine, comprising:
a shaft of the turbomachine having a turbine wheel coupled to a first end of the shaft;
a turbine housing section disposed over the turbine wheel;
a compressor section disposed on a second end of the shaft;
a compressor wheel disposed within the compressor section, the compressor wheel being secured to the second end of the shaft;
a rotor fit over a portion of the shaft, the rotor being located between the turbine and compressor wheels wherein: the portion of the shaft over which the rotor is fit has first, second, and third axial sections having first, second, and third diameters, respectively; an inside diameter of the rotor is greater than the second diameter with a gap defined therebetween; and the second axial section is located between the first and third axial sections,
wherein the shaft is threaded along at least a fraction of the first axial section portion and an inside surface of the rotor is threaded along a portion that engages with the threads on the shaft, and
wherein the first diameter is equal to the inside diameter of the rotor and the third diameter is greater than the inside diameter of the rotor.

16. The turbocharger of claim 15 wherein the length of the first, second, and third axial sections are selected to minimize vibrational characteristics within the speed range of the turbocharger.

17. The turbomachine of claim 15 wherein:
the third axial section is located between a fourth axial section and the second axial section;
the fourth axial section has a fourth diameter that is greater than the third diameter; and
an interface between the third and fourth axial sections forms a stop that prevents the rotor from being slid onto the fourth axial section.

18. An electronically-controlled turbomachine, comprising:
a rotor having a bore, the bore having a first axial rotor section, a second axial rotor section and a third axial rotor section; and
a shaft having a wheel coupled to a first end of the shaft, the shaft having an axial portion adapted to engage with the rotor, the axial portion having: a first axial shaft section engaged with the first axial rotor section, a second axial shaft section within the second axial rotor section, and a third axial shaft section engaged with the third axial rotor section wherein:
the second axial shaft section is located between the first and third axial shaft sections; and
a difference between an inner diameter of the second axial rotor section and an outer diameter of the second axial shaft section is greater than a difference between an inner diameter of the third axial rotor section and an outer diameter of the third axial shaft section,
wherein a part of the first axial shaft section is threaded, and wherein a part of the first axial rotor section is threaded and engaged with the threads on the first axial shaft section or the turbomachine further comprises a nut engaged with the threads on the first axial shaft section.

19. The turbomachine of claim 18 wherein:
an outer diameter of the first axial shaft section equals the outer diameters of the second and third axial shaft sections; and
the inner diameter of the first axial rotor section is equal to the outer diameter of the first axial shaft section.

20. The turbomachine of claim 18 wherein:
the outer diameter of the second axial shaft section is less than the outer diameter of the first axial shaft section.

21. The turbomachine of claim 18 wherein the first axial shaft section is farther from the wheel than the third axial shaft section and an outer diameter of the third axial shaft section is equal to an outer diameter of the third axial shaft section such that the third axial shaft section and the third axial rotor section form one of a slip fit and an interference fit.

22. The turbomachine of claim 18 wherein the wheel is a turbine wheel, the turbomachine further comprising:

a compressor wheel coupled to a second end of the shaft with the rotor located between the turbine wheel and the compressor wheel.

23. The turbomachine of claim 18 wherein the first axial shaft section is farther from the wheel than the third axial shaft section; the shaft has a stop that is located between the third axial shaft section and the wheel; the stop has a greater diameter than an outer diameter of the third axial shaft section; and the stop locates the rotor onto the shaft in an axial direction.

24. The turbomachine of claim 18 wherein:
the first axial shaft section is farther from the wheel than the third axial shaft section;
a gap exists between the second axial shaft section and the second axial rotor section;
the third axial shaft section engages with the third axial rotor section with an interference fit; and
the wheel is a turbine wheel, the turbomachine further comprising:
a compressor wheel coupled to a second end of the shaft.

25. The turbomachine of claim 18 wherein the rotor is affixed to the shaft by one of:
electron beam welding, laser welding, tungsten inert gas welding, ultrasonic welding, and
friction welding by rotating the shaft relative to the rotor.

\* \* \* \* \*